Nov. 29, 1938. R. WICHTENDAHL 2,138,393
FRICTION CLUTCH
Filed Oct. 28, 1935 2 Sheets-Sheet 1

Inventor
R. Wichtendahl:
by
W. E. Ewalt
Attorney.

Nov. 29, 1938.    R. WICHTENDAHL    2,138,393
FRICTION CLUTCH
Filed Oct. 28, 1935    2 Sheets-Sheet 2

Inventor
R. Wichtendahl
by
W. E. Evans
Attorney.

Patented Nov. 29, 1938

2,138,393

UNITED STATES PATENT OFFICE 2,138,393

FRICTION CLUTCH

Rudolf Wichtendahl, Hanover, Germany

Application October 28, 1935, Serial No. 47,167
In Germany December 31, 1934

4 Claims. (Cl. 192—88)

In friction clutches operated hydraulically, particularly friction clutches for motor vehicles, it is known to actuate a cylindrical piston under oil pressure, which produces the clutching movement. This has one disadvantage, viz, that the packing around the piston is not perfectly tight, which may cause breakdowns by loss of oil and pressure, or by jamming where the parts fit too tightly. It is furthermore known to use a diaphragm instead of the piston, and in both cases to provide counter springs which, when the pressure of the liquid ceases, return the piston or the diaphragm to the inoperative position. These constructions operate successfully with brakes, but are ineffective for clutches.

The invention is based upon the fact that in clutches the liquid in the chamber which is closed by a diaphragm is under the action of centrifugal force. The centrifugal force far exceeds the strength of ordinary counter-springs which, as will be understood, return the diaphragm to the inoperative position only when the pressure in the liquid ceases. Even when the hydraulic chamber is not under the pressure of the pump, the centrifugal pressure of the liquid in the chamber overcomes the strength of the counter-springs and the diaphragm is pressed outwardly and thus the clutch is engaged, so that it is totally impossible to de-clutch when the speed of rotation of the clutch is high.

According to the invention, in hydraulically operated friction clutches in which a pressure plate acted upon on the one side by the liquid under pressure through a diaphragm plate which closes the liquid chamber and on the other side by springs, the diaphragm plate is corrugated and so clamped in position that it does not bear directly against the pressure plate at the edge where it is clamped and the springs only yield to the coupling pressure or, in other words, are of sufficient strength to prevent the centrifugal force of the liquid from operating the clutch. Thus the clutch responds solely to the pressure of the liquid imposed by the pump supplying the chamber. By this means it is possible to disengage the clutch or to maintain it in engagement for braking purposes when travelling without difficulty.

When the number of revolutions is low the springs manifest an excess of counter pressure, which assists in easing the clutching action at low speed.

To avoid over-stressing and therefore to ensure proper working of the clutch, both the diaphragm and that side of the pressure plate cooperating therewith may be corrugated in known manner. Furthermore the diaphragm may be provided at the clamping position with one or more annular discs, the internal diameters of which progressively decrease.

The accompanying drawings illustrate by way of example a hydraulically operated friction clutch according to the invention.

Figure 3 shows on an enlarged scale in axial section the parts which hold the diaphragm.

Figure 1:
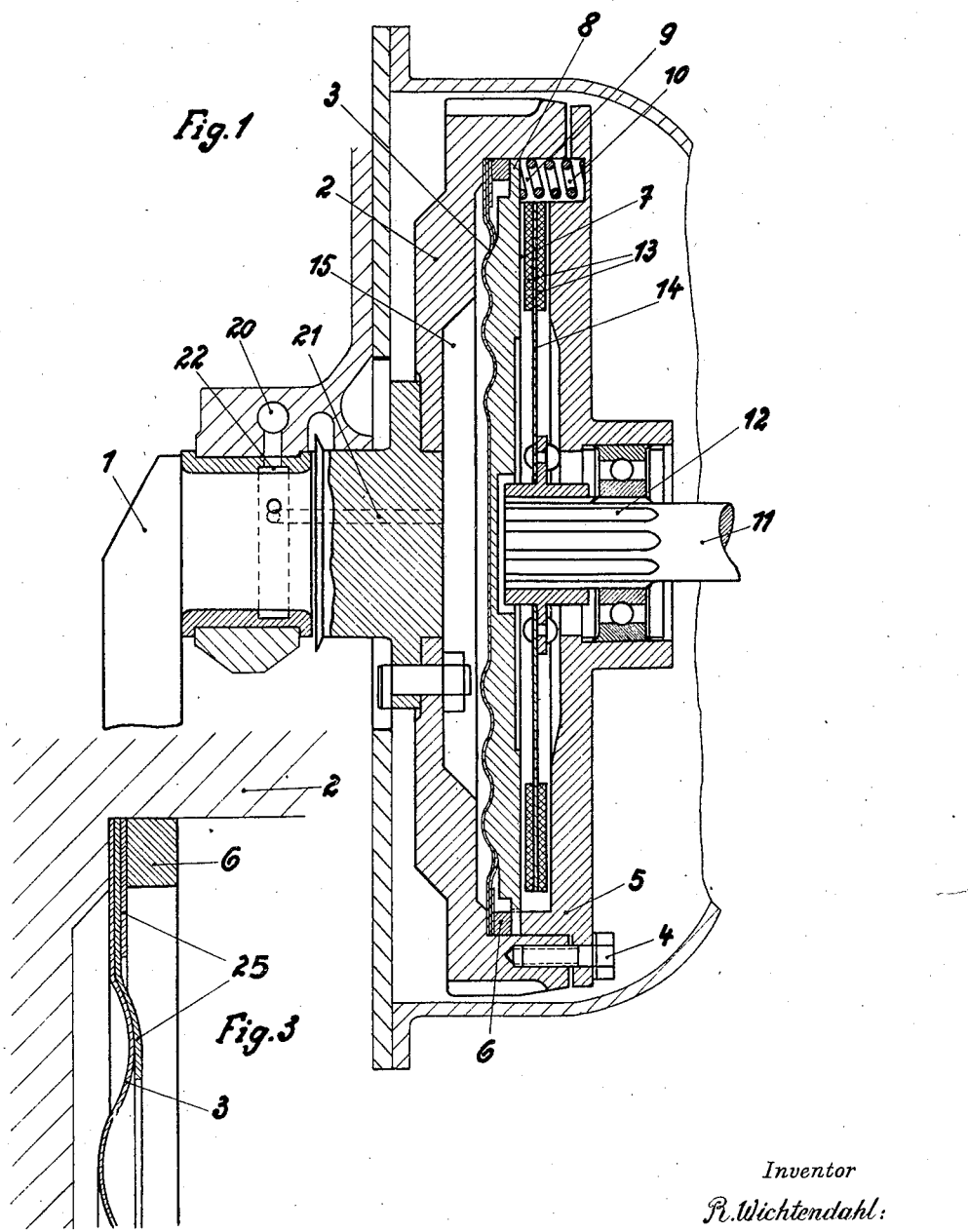
Figure 1 is an axial section through the clutch.

Referring to the drawings, the end of the motor shaft 1 is in known manner provided with a securely held flywheel 2 which has a diaphragm 3 secured within its cylindrical cavity. The diaphragm is secured in position in such manner as to ensure liquid tightness by means of screws 4, a suitably shaped cover plate 5 and a ring 6.

A pressure plate 7 is provided peripherally with uniformly distributed projections 8; these projections engage in corresponding recesses 9 in the cover plate 5 so that the pressure plate 7 can move axially while being prevented from rotating with respect to the cover plate 5 or the flywheel 2. Springs 10 press the plate 7 against the ring 6. The disc 14 which is covered on both sides with annular frictional plates 13 is secured at the end of the gear shaft 11 by means of grooves 12 disposed in star formation, so that it is free between the pressure plate 7 and the cover plate 5. When the driving engine is not running the springs 10 press the pressure plate 7 backward; the clutch is thus out of engagement. When the driving engine is running but no pressure is being exerted on the diaphragm by the oil pump, the liquid which is in the hydraulic chamber 15 is subject to centrifugal force. In order to prevent the centrifugal force from causing clutching by the diaphragm 3 pressing the disc 14 against the cover plate 5 by means of the pressure plate 7, the springs 10 must be of such a size that they neutralize the centrifugal force which may arise when the clutch rotates at its highest speed. Consequently the diaphragm, and therefore also the clutch are sensitive only to the pressure which is produced when the oil pump delivers into the chamber 15.

Figure 2:
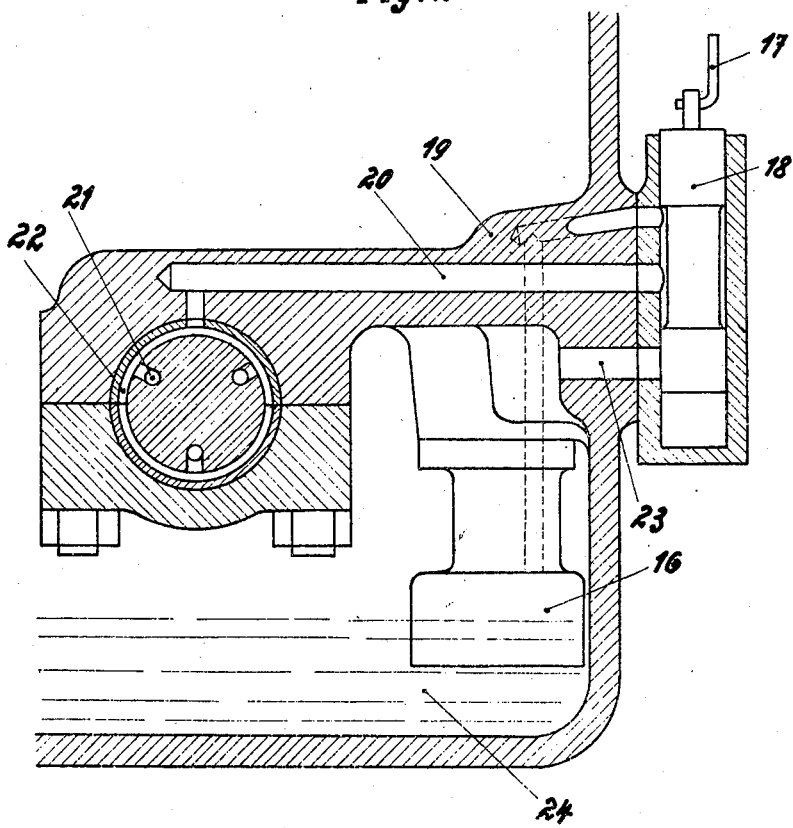
Figure 2 illustrates the front wall of the casing 10 at an angle of 90° from that shown in the axial section.

The oil under pressure is fed to the diaphragm from the oil pump 16 (Figure 2) through the slide valve 18 actuated by the rod 17, thence through passages 20, 21 provided directly in the wall 19 of the casing and in the engine shaft 1 through the intermediary of an annular groove 22 provided in the bearing liner between the two passages 20, 21, so that the oil supply and discharge pipes are absolutely safe against breakage.

If the slide valve 18 is brought into the position illustrated by a pull exerted on the rod 17, the chamber 15 becomes charged with oil under pressure, and the driving shaft is thus coupled up; when the rod 17 is lowered the compressed oil in the hydraulic chamber 15 flows back into the oil bath 24 by way of the slide valve 18 and the passage 23. As the diaphragm has no need for packing there can be no loss of oil or pressure. The diaphragm 3 may be conveniently corrugated to render it more sensitive and the contacting face of the pressure plate 7 may be correspondingly formed. Furthermore, as will be seen from Figure 3 the diaphragm in the clamping position has behind it annular discs 25, the internal diameters of which decrease progressively, in order to distribute the flexure of the diaphragm over a large surface.

I claim:—

1. An hydraulically actuated clutch intended more particularly for automobiles, comprising a shaft, a flywheel secured to the said shaft and provided with a closed concentric chamber which may be filled with oil under pressure, a flexible member forming a closure to the said chamber and provided with annular corrugations, means for clamping the flexible member in position upon the fly-wheel, an annular disc applied at the periphery of the flexible member at the clamping position for the reinforcement of the outer portion of the said member, a pressure plate concentric with the fly-wheel and against which the flexible member lies, the said pressure plate being formed with corrugations corresponding to those of the flexible member, means by which the said pressure plate is mounted to move axially in relation to the fly-wheel, springs acting upon the said pressure plate to maintain it in the direction of the fly-wheel, and a cover plate secured to the fly-wheel, and a coupling disc slidably, but non-rotatably, mounted upon a second shaft and disposed between the pressure plate and the said cover plate and to be engaged between the pressure plate and the said cover plate.

2. An hydraulically actuated clutch intended more particularly for automobiles, comprising a shaft, a fly-wheel secured to the said shaft and provided with a closed concentric chamber which may be filled with oil under pressure, a flexible member forming a closure to the said chamber and provided with annular corrugations, means for clamping the flexible member in position upon the fly-wheel, a number of juxtaposed annular discs applied at the periphery of the flexible member at the clamping position for the reinforcement of the outer portion of the said member, each successive annular disc in the direction away from the flexible member having a larger internal diameter than the preceding disc, a pressure plate concentric with the fly-wheel and against which the flexible member lies, the said pressure plate being formed with corrugations corresponding to those of the flexible member, means by which the said pressuer plate is mounted to move axially in relation to the flywheel, springs acting upon the said pressure plate to maintain it in the direction of the fly-wheel, a cover plate secured to the fly-wheel, and a coupling disc slidably, but non-rotatably, mounted upon a second shaft and disposed between the pressure plate and the said cover plate and to be engaged between the pressure plate and the said cover plate.

3. In a fluid operated clutch for vehicles having drive and driven shafts, a flywheel secured to the drive shaft and provided with a recess communicating with a source of fluid under pressure, a flexible member carried by the flywheel and cooperating with the recess to form a closed chamber, a cover plate spaced axially outwardly from the flexible member and secured to the fly-wheel, a pressure plate positioned between the flexible member and cover plate for axial movement relative to the flywheel, a ring positioned between the flexible member and pressure plate at the peripheries of the latter, yieldable means located between the pressure plate and cover plate for resisting axial movement of the pressure plate in a direction away from the flywheel, and a coupling disc non-rotatably and slidably mounted on the driven shaft between the pressure plate and the cover plate for engagement with both of said plates upon movement of the pressure plate against the action of the yieldable means in a direction away from the flywheel by the flexible member in response to fluid pressure in said chamber.

4. In a fluid operated clutch for vehicles having drive and driven shafts, a flywheel secured to the drive shaft and provided with a recess communicating with a source of fluid under pressure, a flexible disc carried by the flywheel and cooperating with the recess to form a closed chamber, a cover plate spaced axially outwardly from the flexible disc and secured to the flywheel, a pressure plate positioned between the disc and cover plate in contacting relation with the outer side of the flexible disc and having the periphery thereof spaced axially outwardly from the periphery of the flexible disc, an annular member disposed between the peripheral portions of the flexible disc and pressure plate, means for clamping the periphery of the disc between the annular member and flywheel, spring means acting upon the periphery of the pressure plate resisting axial movement of the pressure plate in a direction away from the flywheel, means for reinforcing the portion of the periphery of the flexible disc spaced from the pressure plate by said ring, and a coupling disc non-rotatably and slidably mounted upon the driven shaft between the two plates for engagement therewith upon movement of the pressure plate in a direction against the action of the spring means by the flexible disc in response to fluid pressure in said chamber.

RUDOLF WICHTENDAHL.